US005725947A

United States Patent [19]
Johannsen et al.

[11] Patent Number: 5,725,947
[45] Date of Patent: Mar. 10, 1998

[54] COMPOSITE FILM AND USE THEREOF IN THE PRESENCE OF SOLVENTS

[75] Inventors: Heiner Johannsen, Viersen; Richard W. Coates, Neuss-Weckhoven, both of Germany

[73] Assignee: Minnesota Mining And Manufacturing Company, St. Paul, Minn.

[21] Appl. No.: 637,684

[22] PCT Filed: Apr. 29, 1996

[86] PCT No.: PCT/US96/05936

§ 371 Date: Apr. 29, 1996

§ 102(e) Date: Apr. 29, 1996

[87] PCT Pub. No.: WO96/34740

PCT Pub. Date: Nov. 7, 1996

[30] Foreign Application Priority Data

May 5, 1995 [EP] European Pat. Off. ............. 95106807

[51] Int. Cl.$^6$ ..................................................... C09J 7/02
[52] U.S. Cl. ........................... 428/354; 428/355 AC; 428/355 N
[58] Field of Search ......................... 428/354, 355, 428/355 AC, 355 N

[56] References Cited

U.S. PATENT DOCUMENTS

| 2,884,126 | 4/1959 | Ulrich .................. 286/59 |
| 3,547,852 | 12/1970 | Burke, Jr. ............. 260/29.6 |
| 3,905,929 | 9/1975 | Noll .................... 260/29.2 |
| 3,920,598 | 11/1975 | Reiff et al. ........... 260/29.2 |
| 4,181,752 | 1/1980 | Martens et al. ........ 427/54.1 |
| 4,717,621 | 1/1988 | So ..................... 428/354 |
| 4,927,876 | 5/1990 | Coogan et al. ......... 524/457 |
| 4,994,538 | 2/1991 | Lee ................... 526/279 |
| 5,229,207 | 7/1993 | Paquette et al. ....... 428/355 |
| 5,229,209 | 7/1993 | Gharapetian et al. ... 428/403 |
| 5,234,736 | 8/1993 | Lee ................... 428/42 |

FOREIGN PATENT DOCUMENTS

| 0 551 512 A1 | 1/1991 | European Pat. Off. ........ H01L 21/60 |
| 0 454 413 A2 | 10/1991 | European Pat. Off. ........ C09J 7/02 |
| 0 551 512 A1 | 7/1993 | European Pat. Off. ........ H01L 21/60 |
| 0 552 917 A1 | 7/1993 | European Pat. Off. ........ C09J 183/04 |
| 69-027159 | 11/1969 | Japan . |
| 02-145670 | 11/1988 | Japan ..................... C09J 7/02 |

OTHER PUBLICATIONS

"Solvents", Paint Testing Manual, 13rd ed., G.G. Sward, Ed., American Society for Testing and Materials, Philadelphia, Pennsylvania (1972).

Crowley et al., "A Three–Dimensional Approach to Solubility", *Journal of Paint Technology*, vol. 38, No. 496, pp. 269–280 (May 1966).

*Encyclopedia of Polymer Science and Engineering*, vol. 13, pp. 292–293, New York (1988).

Kunststoffhandbuch, vol. 7, Polyurethane, ed. by G. W. Becker et al., München, pp. 22–26 (1983). (with translation).

*Primary Examiner*—Jenna Davis
*Attorney, Agent, or Firm*—John H. Hornickel; Gary L. Griswold; Walter N. Kirn

[57] ABSTRACT

The invention relates to a film composite comprising a thin flexible backing bearing a first layer of adhesive comprising a blend of from 10–99 wt. % of an acrylic latex and from 1 to 90 wt. % of heat-activatable urethane latex, and a second adhesive layer applied on top of said first adhesive layer comprising a pressure-sensitive adhesive exhibiting an initial adhesion as to allow reliable positioning and initial removability of said film composite on a substrate and an adhesion build-up to permanently bond the film composite to the substrate after a prolonged dwell time. The invention further-more relates to the use of a film composite comprising a thin flexible backing bearing a first adhesive layer comprising a blend of from 10–99 wt. % of an acrylic latex and from 1 to 90 wt. % of a heat-activatable urethane latex, and optionally bearing a second adhesive layer applied on top of said first adhesive layer, comprising a pressure-sensitive adhesive which exhibits an initial adhesion as to allow reliable positioning and initial removability of the film composite on a substrate and an adhesion build-up to permanently bond the film composite to the substrate after prolonged dwell time, for applying on substrates exposed to organic solvents and, in particular, to fuels for internal combustion engines.

17 Claims, No Drawings

COMPOSITE FILM AND USE THEREOF IN THE PRESENCE OF SOLVENTS

FIELD OF THE INVENTION

The invention relates to film composites comprising a thin, flexible backing having one or more adhesive layers thereon, and to the use of the film composites on substrates exposed to organic solvents and, in particular, to petroleum fuel vapors or petroleum fuel or oil spillage.

BACKGROUND OF THE INVENTION

Film composites comprising a thin, flexible, optionally printable, backing having a layer of a pressure sensitive adhesive thereon, such as a polyacrylate based pressure sensitive adhesive material, can be used for the preparation of prefabricated graphics. The graphic appears on the side of the backing having no adhesive, by printing means such as screen-printing or other known printing techniques, and the film composite is subsequently adhered to the substrate.

When adhering these films onto substrates which are frequently or occasionally exposed to petroleum fuel vapor or petroleum fuel or oil spillage (such as onto gasoline or diesel pumps, cars, trucks or tank trucks), failure of the film composites is often observed due to edge lifting and/or swelling of the adhesive layer which results in delamination of the film composite from the substrate. Since delamination starts at the exposed edge of the film, one could protect the edges by using transparent sealing materials such as, for example, Scotchcal™ 3950 material (commercially available through Minnesota Mining and Manufacturing Company of St. Paul, Minn., U.S.A., "3M") or by transparent overlaminate constructions using, for example, Scotchcal™ 3640-114 film (commercially available through 3M). These solutions are, however, considered to be less attractive from an aesthetic point of view. Also application of edge protection requires an additional step of work consuming time and money.

Scotchcal™ 3650 film composites (commercially available through 3M, St. Paul, U.S.A.) which comprise a crosslinked acrylate copolymer on a primed polyvinylchloride backing, are characterized by a good chemical resistance. Presently they are frequently used for substrates exposed to petroleum fuel vapors or petroleum fuel or oil spillage. While the general chemical resistance of the film and its bulk resistance against diesel vapors, diesel spillage and oil, in particular, are excellent, film lifting has been observed occasionally when the films were exposed to petroleum spillage or to an atmosphere heavily loaded with petroleum vapors.

In the literature, pressure sensitive adhesives are described which among other properties are reported to exhibit an improved resistance against oil or gasoline.

JP 69-027,159 describes a film comprising, for example, a polyvinylchloride backing carrying a pressure sensitive adhesive consisting of 100 parts by weight era copolymer containing 85–99 wt. % of an acrylic acid ester and 0.2–15 wt. % of (meth)acrylic acid or ethyleneglycol mono(meth) acrylate, and up to 10 parts by weight era crosslinking component. The film is characterized as having improved oil-resistance.

JP 02-145,670 proposes pressure sensitive adhesive tapes, the edges of which are coated with a composition comprising methyl hydrogen silicone oil, a salt of Zn, Sn or Zr, an alkaline compound and a halogenation agent in order to increase resistance to gasoline and solvents.

U.S. Pat. No. 4,994,538 describes a siliconized emulsion based pressure sensitive adhesive comprising at least one reactive silicone acrylate polymer, one or more unsaturated carboxylic acids and one or more alkyl soft acrylates. The adhesive is characterized as gasoline resistant and having specific adhesion to automotive paints. A similar adhesive is described also in U.S. Pat. No. 5,234,736.

EP 0,552,917 reports fuel and solvent resistance for a fluoro silicone pressure sensitive adhesive comprising 5–70 wt. % of fluorosilicone polymers, 10–60 wt. % of siloxane copolymer resins containing silanol, and 10–50 wt. % of compatible diorganosiloxane polymers.

When being applied to gasoline or diesel pumps, tank trucks, and the like, film composites comprising a layer of pressure sensitive adhesive material not only should show a high resistance against petroleum products while retaining a high dimensional stability (i.e. no or at least a low and at any rate acceptable degree of swelling), but they also should exhibit a low stainability by the dyes typically added to gasoline or diesel fuel for labeling reasons, particularly in Europe. Film composites which have been described in the literature do not fulfill all requirements of a high resistance against organic solvents and, in particular, against petroleum fuel vapors or petroleum fuel or oil spillage to a practically sufficient or desirable extent, and/or the film constructions are too complicated and/or the pressure adhesives are too expensive to be widely used. Most of the literature furthermore discusses the resistance against organic solvents and petroleum fuels in terms of bulk resistance while not recognizing the need for addressing the stability of the phase transition zone comprising the edge of the film composite, the surface the substrate and the surrounding atmosphere.

BRIEF SUMMARY OF THE INVENTION

The present invention relates to a film composite comprising a thin flexible backing bearing a first adhesive layer comprising a blend of from 10–99 wt. % of an acrylic latex and from 1 to 90 wt. % of a heat-activatable urethane latex, and a second adhesive layer, applied on top of said first adhesive layer, comprising a pressure-sensitive adhesive which exhibits an initial adhesion as to allow reliable positioning and initial removability of the film composite on a substrate and an adhesion build-up to permanently bond the film composite to the substrate after a prolonged dwell time. Preferably, both adhesive layers are composed of pressure-sensitive adhesives.

The invention furthermore relates to the use of a film composite comprising a thin flexible backing bearing a first adhesive layer comprising a blend of from 10–99 wt. % of an acrylic latex and from 1 to 90 wt. % of a heat-activatable urethane latex, and optionally bearing a second adhesive layer applied on top of the first adhesive layer, comprising a pressure-sensitive adhesive which exhibits an initial adhesion as to allow reliable positioning and initial removability of the film composite on a substrate and an adhesion build-up to permanently bond the film composite to the substrate after a prolonged dwell time, for use in applying to substrates exposed to organic solvents and, in particular, to petroleum fuel vapors or petroleum fuel spillage.

The use of film composites bearing only the acrylate/urethane latex adhesive layer with the second adhesive layer being omitted, is preferred. It has now been found that this film composite (which is described in U.S. Pat. No. 5,229,209 and EP 0,454,413) exhibits a good or even very good resistance to petroleum fuel vapors or petroleum fuel or oil spillage. The adhesive layer comprising the acrylate/ urethane latex blend can be pressure-sensitive, although it does not need to be tacky to the touch at ordinary room temperatures in which case it usually becomes permanently bonded at room temperature under fingertip pressure to various substrates such as, for example, to polymer substrates like polyvinylchloride films or polyvinylchloride coated papers but also to other substrates like, for example, other polymer substrates, optionally paint or lacquer-coated metal substrates or glass substrates.

It was also unexpectedly found by the present inventors that applying a second adhesive layer on top of the first adhesive layer of the films composites known from EP '413, often is advantageous. The second adhesive layer comprises a pressure-sensitive adhesive exhibiting an initial adhesion as to allow reliable positioning and initial removability of said film composite on a substrate and an adhesion build-up to permanently bond the film composite to the substrate after prolonged dwell time. This two adhesive layer film composite is new and has a good or even very good resistance against diesel fuel and oil and an acceptable to good resistance to gasoline fuel according to the tests described below.

The two-layer film composites exhibit, on the one hand, a more complicated construction than one adhesive layer film composites but they offer, on the other hand, an easier handling and a more precise positionability on the substrate. A person skilled in the art can decide without any inventive effort whether the one adhesive layer or the two adhesive layer embodiment of the film composite is more appropriate with respect to a specific application.

DETAILED DESCRIPTION OF THE INVENTION

The film composite used in the present invention has a thin, flexible backing which preferably is a polymeric film. Nonlimiting examples of materials for polymeric films include polyolefins, polyesters, polycarbonates or polymethacrylates. Also films of coated papers or flexible metallic films (such as thin aluminum films) can be used as flexible backings.

The backing is preferably printable in order to allow for the preparation of graphics, for example, by means of screen-printing or other printing techniques. Especially preferred are polyvinylchloride backings.

The backing is preferably subjected to treatment with chemical primers or to corona treatment according to techniques known to those skilled in the art, in order to ensure strong adhesion to the first adhesive layer attached to it.

The backing preferably has a thickness between 30 and 70 μm and especially between 40 and 60 μm. In any case, the thickness of the backing is chosen in such a way as to render the film composite sufficiently flexible to allow for easy and proper application to curved and/or irregularly shaped substrates.

The above listing of backing materials and of preferred ranges of the thickness of the backing is merely illustrative and by no means limiting. One skilled in the art can easily and without any inventive input choose other backing materials or dimensions to optimize the film composite with respect to the intended application.

The first adhesive layer attached to the surface of the thin, flexible backing comprises 1) from 10 to 99% of an acrylic latex adhesive and
2) from 1 to 90% of a heat-activatable urethane latex.

Film composites comprising a thin, flexible backing and an acrylic latex/urethane latex layer as specified, are already known from U.S. Pat. No. 5,229,207 and EP 0,454,413 which are incorporated herewith by reference. EP '413 stresses the high resistance against plasticizers (such as diotyl phthalate) and proposes to coat or laminate them onto polyvinylchloride substrates containing migratable plasticizers. The high resistance of these films when being applied to a substrate, to organic solvents and, in particular, to petroleum fuel vapors or petroleum fuel or oil spillage is, however, not disclosed in EP '413 so that the particular usefulness for this application must be considered as not to have been recognized in EP '413.

A preferred acrylic latex is an emulsion polymer or dispersion the precursor of which comprising from 80–100 wt. % of one or more alkyl acrylates having an average of 1–12 carbon atoms, and from 0–20 wt. % of one or more ethylenically unsaturated, copolymerisable monomers which preferably exhibit a strongly polar group such as, for example, (meth)acrylic acid, itaconic acid, maleic acid or acrylamide. The weight percentages refer to the mass of the monomer component of the precursor of the acrylic latex.

Useful alkyl acrylates (i.e. acrylic acid alkyl ester monomers) include linear or branched monofunctional unsaturated acrylates or methacrylates of non-tertiary alkyl alcohols, the alkyl group of which have an average from 4 to 12, and, in particular, from 4 to 10 carbon atoms. The term "average of 4 to 12 carbon atoms", for example, means that the average number of C atoms of the alkyl acrylate compounds, weighed by their respective percentage by weight with respect to the mass of the alkyl acrylate component, is between 4–12 C atoms. Examples of these lower alkyl acrylates useful in the present invention include but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamyl acrylate, n-decyl acrylate, isodecyl acrylate, isodecyl methacrylate, 4-methyl-2-pentyl acrylate and dodecyl acrylate. Preferred lower acrylate and methacrylate esters include isooctyl acrylate, n-butyl acrylate, 2-ethylhexyl acrylate and isononyl acrylate.

Acrylic latices, the alkyl acrylate component of which has a rather low to low average number of carbon atoms of typically 4–8 in the alkyl chain, exhibit a good balance between initial adhesion values and initial removability, i.e. initial positionability and re-positionabilty, as well as an acceptable rate and final level of adhesion build-up. Further, reducing the average number of C atoms in the alkyl chain to 2–3 results in a decrease of initial adhesion and tack but, on the other hand, lead to especially advantageous values of shear modulus. It was further observed that the presence of the polyurethane latex in the first adhesion layer decreases its initial adhesion. The first adhesion layer preferably contains at least 2.5 wt. %, especially at least 5 wt. % and, in particular, at least 10 wt. % of a polyurethane latex in case the average number of C atoms present in the alkyl chain of the alkyl acrylate component of the acrylic latex, is between 2–8 and, in particular, between 2–7.

The precursor of the acrylic latex polymer preferably contains up to 5 and, in particular, 1–4 alkyl acrylates. The concentration of the alkyl acrylate component with respect to the mass of the monomer component of the precursor of acrylic latex polymer preferably is not less than 80 wt. % and more preferably, at least 85 wt. %.

The precursor of the acrylic latex can additionally contain alkyl esters of unsaturated aliphatic carboxylic acids other than acrylic acid such as, for example, alkyl maleales and alkyl fumarates (based, respectively, on maleic and fumaric acid). In this regard, dibutyl maleate, dioctyl maleate, dibutyl fumarate and dioctyl fumarate, are preferred. The amount of ester compounds of unsaturated aliphatic carboxylic acids other than acrylic acid preferably is not too high and, in particular, does preferably not exceed 20 wt. % with respect to the mass of the monomer component of the precursor of the acrylic latex.

The comonomers are preferably used in an amount of from 0.5 to 18 wt. % and, in particular, from 2 to 15 wt. % with respect to the mass of the monomer of the precursor of the acrylic latex. The comonomers preferably are polar. The term "polar monomers" includes both moderately polar and strongly polar monomers. Polarity (i.e., hydrogen-bonding ability) is frequently described by the use of terms such as 'strongly', 'moderately', and 'poorly'. References describing these and other solubility terms include 'Solvents', Paint Testing Manual, 3rd ed., G. G. Seward, Ed., American Society for Testing and Materials, Philadelphia, Pa., and 'A Three-Dimensional Approach to Solubility', Journal of Paint Technology, Vol.38, No.496, pp.269–280. Preferred examples of strongly polar monomers are acrylic acid, methacrylic acid and acrylamides while N-vinyl lactams such as, for example, N-vinyl pyrrolidone, N-vinyl caprolactam, acrylonitrile and dimethyl amino-propyl methacrylate are typical examples of moderately polar monomers.

Strongly polar comonomers are preferred. Especially preferred is the following smaller group of polar comonomers: acrylic acid, methacrylic acid, itaconic acid, hydroxylalkyl acrylates, styrene sulfonic acid or the sodium salt thereof, maleic acid, fumaric acid, citraconic acid, acrylamides and substituted acrylamides.

Strongly polar comonomers tend to impart mechanical stability and cohesive strength to the acrylic latex.

The acrylic latex is preferably prepared by emulsifying its precursor in a continuous phase which preferably is an aqueous medium and more preferably deionized water. The emulsifying component comprises one or more emulsifying agents which are preferably selected from a group comprising nonionic, anionic and amphoteric emulsifying agents.

Especially preferred nonionic emulsifying agents comprise ethoxylated nonyl phenol (commercially available from Rohm & Haas under the trade name Friton N-111) and alkyl aryl polyether alcohols. Anionic emulsifying agents are preferably selected from a group comprising amine or alkali metal salts of dodecyl diphenyl ether disulfonic acid, alkali metal salts of alkyl or aryl sulfonic acids, half and full esters of sulfonated succinic acid and their salts, amine and alkali metal salts of alkyl sulfates which contain at least 8 C atoms; amine and alkali metal salts of alkyl sulfonates which contain at least 8 C atoms, long chain sulfinated or unsulfinated carboxylic acids and sulfonated nonionic emulsifying agents. Suitable amphoteric emulsifying agents include n-cococbeta amino propionic acid, fatty acid esters of alkanolamines, amino acids, amino sulfonic acids and partial sodium salts of N-lauryl beta amino dipropionate.

Especially preferred are emulsifying components comprising at least one anionic and at least one nonionic emulsifying agent. The amount of the emulsifying system is preferably from 1 to 9% with respect to the mass of the monomer component of the precursor of the acrylic latex.

The precursor of the acrylic latex preferably contains a protective colloid component which is also known in the art as a steric stabilizer. Useful protective colloids include polyvinyl alcohol, polyacrylic acid, polymethacrylic acid, hydroxy ethyl cellulose, methyl cellulose and other cellulose ethers and a vinyl ether maleic anydride copolymer. Natural colloids can also be used, a representative being gum tragacanth or casein.

The protective colloid component is preferably added in an amount varying from 0.03 to 6 weight percent based on the weight of the monomer component of the precursor of the acrylic latex.

An initiator component is used to induce polymerization of the monomer component.

The initiator component may or may not include a Redox catalyst depending upon the desired reaction temperature of the emulsion. The initiator component comprises one or more initiator compounds which are preferably selected from a group comprising ammonium persulfate, sodium persulfate, potassium persulfate, hydrogen peroxide, t-butyl hydroperoxide, benzoyl peroxide, azobisisobutyronitrile, methyl ethyl ketone peroxide, perborates, percarbonates, peralkanoates and cumene hydroperoxide. A suitable catalyst component may be added which comprises one or more catalyst compounds which are preferably selected from a group comprising sodium metabisulfite, sodium sulfite, sodium sulfoxylate formaldehyde, ferrous sulfate hydrazine, soluble sulfites such as hydrosulfites and bisulfites, thiosulfates and soluble tertiary amines.

The initiator component is preferably present in an amount of about 0.01 to 3.0% with respect to the mass of the monomer component of the precursor of the acrylic latex. The percentage of the catalyst component may preferably be 0.01 to 3 wt. % with respect to the mass of the monomer component of the precursor of the acrylic latex.

The molecular weight and the intrinsic viscosity of the resulting latex may be adjusted by means of a chain transfer component comprising one or more chain transfer agents such as, for example, aliphatic mercaptans having from 4 to 14 C atoms. T-butyl mercaptan, n-octyl mercaptan and N-decyl mercaptan, are preferred. The chain transfer agent is added in suitable amounts of typical 0.01% and preferably 0.05% or more with respect to the mass of the monomer component of the precursor of the acrylic latex.

The pH of the emulsion may be adjusted by any suitable buffering agent which does not interfere with the formation of free radicals such as, for example, sodium acetate, sodium dihydrogen phosphate, ammonium carbonate and sodium bicarbonate.

In addition to the various components mentioned above, the emulsion may contain small amounts of, for example, thickening agents, plasticizers or electrolytes (such as tetrasodium pyrophosphate or ammonium phosphate). The percentage of these additives preferably is chosen low enough as not to compromise the properties of the latex and is preferably not more than 10 wt. % and more preferably not more than 5 wt. % with respect to the mass of the monomer component of the precursor of the acrylic latex.

In a first step of the emulsion reaction, the protective colloid component, the emulsifying component and the buffering or pH controlling component are typically added to the aqueous medium or deionized water, respectively, which form the continuous phase. Then part of the monomer component and part of the initiator component are usually added to the emulsion to initiate and sustain the polymerization reaction. Both the monomer component and the emulsifying component are typically prepared in separate containers whereby the chain transfer component, if present, and other components or additives are usually added to the monomer component. The remainder of the monomer component and the initiator component are typically fed continuously over some time to the emulsion, and polymerization usually readily proceeds to completion (>98% conversion) at moderately elevated temperatures.

An inherent viscosity of about 5.0 or more is typically attained without further processing. When the resulting latex is filtered, typically less than 0.01 g of coagulum per 1000 g latex is collected.

The acrylic latices and the methods of their preparation described above in some detail are intended to be exemplary only and by no means limiting. Further details on acrylic latices, suitable additives thereto and methods of preparation can be taken, for example, from U.S. Pat. No. 3,547,852.

The preparation of polyurethane latices or dispersions can be accomplished in several ways. Generally, ionic, potentially ionic or nonionic hydrophilic groups are incorporated into the polyurethane backbone or in pendent side chains.

The ionic groups may be cationic, for example,

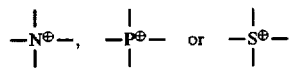

or anionic, for example, $-SO_3^{\ominus}$, $-O-SO_3^{\ominus}$, $-PO_2^{\ominus}$, $-PO_3^{\ominus}$, $-O\ PO_3^{\ominus}$ or $-COO^{\ominus}$.

The term "potentially ionic" refers to groups such as free carboxylic acid or tertiary amino groups which can be converted to ionic groups by neutralization or quaterization. An example for a nonionic hydrophilic groups is a polyether chain segment which may be attached to the polyether as lateral or terminal group.

Processes for the preparation of polyurethane latices include, for example, the solution process, the prepolymer mixing process, the hot-melt process and the ketimine-ketazine process (see, for example, Kunststoffhandbuch, Vol. 7, Polyurethane, ed. by G. W. Becker et at., München 1983, pp. 24–26).

The urethane polymer mixing process is described in some detail in U.S. Pat. No. 4,927,876 which is incorporated herein by reference. According to this process, a water-dispersible isocyanate-terminated prepolymer is prepared first which is subsequently reacted with an active hydrogen containing chain extender to give the polyurethane latex.

Water-dispersible isocyanate-terminated propolymers containing ionic centres may be obtained according to U.S. pat No. '876 by reacting (i) a polyisocyanate component with (ii) an active hydrogen component comprising at least one polymeric polyol having a molecular weight in the range of 400 to 6,000 and optionally one or more low molecular weight polyols or polyamines having a molecular weight below 400 whereby at least one of the polyols or polyamines contains ionic or potentially ionic groups.

U.S. Pat. No. '876 further discloses that water-dispersible isocyanate-terminated prepolymers containing nonionic hydrophilic centres can be obtained by reacting (i) a polyisocyanate component with (ii) a polymeric polyol having a molecular weight in the range of 400 to 6,000 and (iii) a dispersing diol and/or diisocyanate having a pendent polyoxyethylene chain.

The choice of the polyisocyanate component, the polymeric polyol component and the low molecular weight polyol component is established by the ability of the polyurethane latex to mix well with the acrylate latex to form the adhesive layer, according to techniques known to those skilled in the art. Specific materials are listed in U.S. Pat. No. '876. Diols and diisocyanates, respectively, having pendent polyoxyethylene chains are described, for example, in U.S. Pat. No. 3,905,929 and U.S. Pat. No. 3,920,598, respectively.

The prepolymers obtained are dispersed or emulsified in an aqueous medium or preferably in deionized water. According to Kunststoffhandbuch, Vol. 7, Polyurethane, ed. by G. W. Becker et at., München 1983, pp. 22–24, prepolymers can be dispersed in water or aqueous media if the medium molecular weight does not exceed about 8,000. No emulsifying component is required for prepolymers exhibiting ionic, potentially ionic or nonionic hydrophilic groups while an emulsifying component must typically be added in case of non-hydrophilic prepolymers. The choice of suitable emulsifying agents is not critical but emulsifying agents showing a chemical structure similar to that of the prepolymer are preferred.

Polyurethane latices are then obtained by reacting the emulsified prepolymer with an active hydrogen containing chain extender. The active hydrogen chain entender component preferably comprises one or more compounds selected from a group comprising polyols, amino alcohols, ammonia, primary or secondary aliphatic, alicyclic, aromatic, araliphatic or heterocyclic amines and preferably diamines, optionally substituted hydrazine or water. Specific examples of useful active hydrogen containing chain extender compounds are listed in U.S. Pat. No. '876, column 6, lns. 34–55.

The prepolymer mixing method of preparation of aqueous polyurethane latices described above in some detail, is only explanatory and by no means limiting. Other suitable methods of preparation are described, for example, in Encyclopedia of Polymer Science and Engineering, New York 1988, Vol. 13, pp. 292–93.

Polyurethane latices useful in the present invention are self-adhesive or heat-activatable. The choice of the polyurethane latex and its amount influences the properties of the first adhesive layer. The polyurethane latices when coated as a film with a dry thickness of 40–50 µm, preferably exhibit an elongation of at least 100%, more preferably of at least 200% and especially preferably of at least 400%. Otherwise the adhesive layer comprising the acrylic latex/urethane latex blend, may be unduly firm and exhibit undesirably low adhesion values. Polyurethane latices comprising polyester polyurethanes, polyether polyurethanes and/or polycarbonate polyurethanes are preferred with polyester polyurethanes being especially preferred. An especially preferred polyester polyurethane latex known to blend easily with a wide range of acrylic latices, is commercially available from Mobay under the tradename BayHydro 140 AQ.

The acrylic latex and the urethane latex are most easily blended together when approximately equal in pH but can typically also be blended when the acrylic latex and the polyurethane latex exhibit different pH's within a pH range of from 3–11. If the urethane latex comprises an emulsifying component, the emulsifier loads of the acrylic latex and the urethane latex are preferably approximately equal. Preferably, the emulsifying components are both anionic or both cationic or one is anionic while the other is nonionic.

The first adhesive layer can be obtained by coating a blend of the acrylic and polyurethane latex onto the backing with subsequent drying. Alternatively, the emulsion can be applied to a release liner selected, for example, from a group of release liners comprising siliconized papers, siliconized polyesters, polyethylenes or polymers treated with fluorochemicals, to be dried thereon. The dried adhesive layer is then attached to the optionally primed backing, and the release liner is finally removed.

In both routes of preparation, the solid content of the aqueous emulsion preferably ranges between 20–80 wt. % and, in particular, between 30–80 wt. % prior to drying. The thickness of the coated aqueous emulsion prior to the drying step is preferably chosen between 100 and 150 μm. The drying temperature preferably is between 40° to 100° C., and the coating weight of the dried emulsion polymer preferably is between 20 to 40 g/m². The remaining water content preferably is less than 3 wt. % and, in particular, less than 2 wt. %. The process parameters mentioned are to be understood to be merely illustrative and by no means limiting. One skilled in the art can easily modify and optimize these parameters and choice of latices.

Surprisingly it has been found that the one adhesive layer composite films thus obtained, are characterized by a relatively high resistance against organic solvents such as, for example, ethanol, isopropanol, n-butanol, trichloroethane, ethyl acetate, n-heptane and toluene and by a high to very high resistance to petroleum fuel vapors or petroleum fuel or oil spillage. The resistance refers both to the bulk properties of the films and especially to the properties of the phase transition zone comprising the edge of the film composites, the surface of the substrate and the surrounding atmosphere. It was found that the one adhesive layer film composites which were first described in EP '413, exhibit a long to very long lifetime when being applied to a substrate which is often exposed to organic solvents and, in particular, to petroleum fuel vapors or petroleum fuel or oil spillage, and experience distinctly less damage in the phase transition zone like edge swelling, edge lifting and/or delamination compared to films described in the state of the art.

Preferred are one adhesive layer film composites wherein the dried adhesive comprises at least 25 wt. % and more preferably not less than 30 wt. % of the polyurethane component with respect to the mass of the dried first adhesive layer of the film composite.

It was further found that the initial adhesion and removability of the film composites used in the present invention, and their final adhesion after a prolonged dwell time, can be improved when a second adhesive layer is applied on top of said first adhesive layer. The second adhesive layer can comprise a pressure-sensitive adhesive material which is, for example selected from the group consisting of polyacrylates, vinyl ether polymers, silicone pressure sensitive adhesives, natural rubbers, styrene-butadiene-styrene block copolymers, elastomeric rubbers, and blends of these materials.

The adhesive material of the second adhesive layer is preferably selected as to show
- an initial value of 180° peel adhesion on stainless steel after a dwell time of 24 h of preferably between 15–25 N/2.54 cm and more preferably between 18 and 22 N/2.54 cm in order to allow reliable positioning and initial removability, and
- a value of 180° peel adhesion on stainless steel after a prolonged dwell time of typically at least 3 days or more of preferably at least 20 N/2.54 cm and more preferably not less than 25 N/2.54 cm in order to ensure permanent bonding of the film composite to the substrate.

The second adhesive layer preferably comprises a polyacrylate based pressure-sensitive adhesive material.

It was surprisingly found that the resistance of these two adhesive layer film composites according to the present invention to organic solvents such as, for example, ethanol, isopropanol, n-butanol, trichloroethane, ethyl acetate, n-heptane and toluene and especially to petroleum fuel vapors or petroleum fuel or oil spillage, is higher than the corresponding resistance of a one adhesive layer film composite comprising the backing and the second adhesive layer of the corresponding two adhesive layer film composite of the present invention only. The reason for the improved resistance of the two adhesive layer film composite according to the present invention in comparison to the corresponding one adhesive layer film composite which does not contain the acrylic latex/urethane latex adhesive layer is not understood. It was found that the resistance of the two adhesive layer film composite according to the present invention to organic solvents and, in particular, to petroleum fuel vapors or petroleum fuel or oil spillage decreases when the second adhesive layer is distinctly thicker than 200 μm. The thickness of the second adhesive layer preferably is not more than 150 μm and, in particular, between 10–100 μm.

In comparison to the one adhesive layer film composites used in the present invention comprising an acrylic latex/urethane latex blend, the corresponding two adhesive layer film composites according to the present invention exhibit on the one hand an improved initial handleability but on the other hand a lower resistance against organic solvents and, in particular, to petroleum fuel vapors or petroleum fuel or oil spillage. Whether the one adhesive layer film composite used in the present invention which comprises an acrylic latex/polyurethane latex, or the two adhesive layer film composite according to the present invention, is more advantageous depends on the specific requirement of a concrete application. The person skilled in the art can easily make such choice on the basis of the present specification without any inventive input being necessary.

The second adhesive layer of the two adhesive layer film composites according to the present invention preferably is acrylate-based and especially preferably comprises a comonomer of one or more acrylic acid esters of a non-tertiary alcohol, the alcohol having from 1 to 18 C atoms with the average number of C atoms being about 4–14, and a functional monomer copolymerizable with the acrylic acid ester.

Acrylic acid esters useful for the preparation of the second adhesive layer, include monofunctional, unsaturated acrylate ester monomers. These alkyl acrylate monomers preferably have from 1 to about 14 C atoms in the alkyl chain and more preferably most of the alkyl acrylate monomers comprise from about 4 to about 12 carbon atoms in the alkyl chain. The lower alkyl acrylates, i.e. those having 1–3 C atoms in the alkyl chain, are not preferred as they tend to adversely affect the adhesion properties of the second adhesive layer, i.e. impart too low values of adhesion on many substrates. Alkyl acrylates exhibiting more than 12 C atoms in the alkyl chain tend to render the adhesive crystalline and are therefore less preferred. The initial adhesion typically increases and the initial removability typically decreases with increasing number of C atoms in the alkyl chain so that the expert can easily adjust a desired combination of properties with respect to a specific application without any inventive input.

Especially preferred are the following acrylate ester monomers: n-butyl acrylate, hexyl acrylate, isooctyl acrylate, 2-ethylhexyl acrylate, isononyl acrylate, decyl acrylate, dodecyl acrylate, and mixtures thereof The amount of the acrylic ester component with respect to the mass of the second adhesive layer preferably is at least about 70 wt. % and more preferably from about 75 to 98 wt. %.

The functional monomer copolymerizable with the acrylic acid ester component is incorporated into the precursor of the second adhesive layer so as to modify the final properties of the latter such as, for example, cohesion, initial tack and adhesion, peel adhesion or shear holding strength. The functional monomer preferably is a moderately polar or a strongly polar compound. Strongly polar monomers useful in the present invention preferably include, for example, acrylic acid, methacrylic acid, itaconic acid, hydroxylalkyl acrylates, styrene sulfonic acid or the sodium salt thereof, maleic acid, fumaric acid, citraconic acid, acrylamides and substituted acrylamides.

Preferred moderately polar monomers are, for example: N-vinyl lactams such as N-vinyl pyrrolidone or N-vinyl caprolactam, acrylonitrile and dimethyl amino-propyl methacrylate.

The acrylate copolymer pressure sensitive adhesives preferably used for adhesive layer 2, can be obtained by solution or emulsion polymerization as is described, for example, in U.S. Pat. No. 2,884,126. A solvent-free polymerization process is disclosed, for example, in U.S. Pat. No. 4,181,752.

The precursor of the second adhesive layer is preferably coated onto a release liner, and the cured adhesive layer is subsequently laminated onto the first acrylic latex/urethane latex adhesive layer. It is, however also possible to coat the precursor of the second adhesive layer onto the acrylic latex/urethane latex adhesive layer with subsequent curing.

The use of an acrylate copolymer pressure sensitive adhesive for the second adhesive layer is only explanatory and by no means limiting. A wide variety of pressure sensitive adhesive materials known in the art may be used and the person skilled in the art can select a useful adhesives, for example, from the group of pressure sensitive adhesives mentioned above.

In addition to the components mentioned above, both the first and second adhesive layer may contain other materials and additives. It was, however, observed that adding of further ingredients to the acrylic latex/urethane latex blend is somewhat critical and might adversely affect the resistance of both the one adhesive layer film composites according to EP '413 used in the present invention, and the two adhesive layer film composites according to the present invention, to organic solvents and, in particular, to petroleum fuel vapors or petroleum fuel or oil spillage. When trying, for example, to increase the initial adhesion of the first adhesive layer by adding one or more tackifiers, a distinct deterioration of the resistance to organic solvents and, in particular, to petroleum fuel vapors or petroleum fuel or oil spillage was observed. Other additives such as, for example, fillers, chain transfer agents, pigments and opacifiers turned out to be less critical with respect to the performance of the first adhesive layer. Additives to the acrylic latex/urethane latex blend are preferably used in a rather low to low concentration of at most 10 wt. % and, in particular, of 7.5 wt. % or less with respect to the mass of the first adhesive layer.

Contrary to this, the second adhesive layer of the two adhesive layer film composites according to the present invention is less sensitive to the presence of additives, and fillers, tackifiers, chain transfer agents, colored pigments, opacifiers, solvents and/or other additives known to the person skilled in the art may be incorporated into the second adhesive layer. The amount of the additives preferably is not more than 20 wt. % and, in particular, less than 15 wt. % with respect to the mass of the second adhesive layer.

The film composite according to EP '413 or the two adhesive layer film composite according to the present invention can be applied to a great variety of substrates such as, for example, a polymer or metal substrate selected from a group comprising polyvinylchloride, fibre reinforced plastics, aluminum, iron, stainless steel or brass. The substrate can preferably be painted or coated with a lacquer. The substrates mentioned are exemplary only and by no means limiting.

Prior to adhering the supported film, the substrate is usually treated with a protic solvent such as, for example, acetone, methanol, ethanol, isopropanol or aqueous solutions thereof in order to remove organic and/or inorganic contaminations from the surface. The cleaning treatment should be chosen carefully in order not to damage the substrate surface. In most cases, diluted aqueous solutions of protic solvents such as enumerated above, or surfactant/water systems can be used. After an appropriate surface treatment, the substrate is rinsed with water and dried.

It was found that one adhesive layer film composites according to EP '413 when applied to a substrate, are characterized by an especially advantageous resistance to organic solvents and, in particular, to petroleum fuel vapors or petroleum fuel or oil spillage, and by a low stainability. Two adhesive layer film composites according to the present invention exhibit an easier initial handleability on a wide variety of substrates and also a higher final adhesion, but on the other hand a lower resistance to petroleum fuel vapors or petroleum fuel or oil spillage. Two adhesive layer film composites are preferred for most applications because they can be applied more easily and exhibit a resistance to petroleum fuel vapors or petroleum fuel or oil spillage which is good or at least sufficient for many applications.

The present invention describes the use of film composites which are characterized by a high resistance to petroleum fuel vapors or petroleum fuel or oil spillage and by low stainability when being applied to a substrate. The one adhesive layer film composites according to EP '413 and the two adhesive layer film composites according to the present invention exhibit a simple construction and they fulfill the stringent demands to be met, for example, in petroleum fuel stations or in other surroundings characterized by the presence of petroleum fuel vapors and/or occasional petroleum fuel or oil spillage, to a higher degree than film composites previously used. The use of the one adhesive layer film composites according to EP '413 and of the two adhesive layer film composites according to the present invention is therefore of considerable economic importance.

A series of non-limiting examples are set out below to illustrate the invention in its various aspects. If not indicated otherwise, parts are given by weight. First, however, certain procedures and tests methods utilized in the examples will be described, with exceptions thereto being specifically noted in the examples themselves.

Preparation of Pump Panel Samples

The films were cut in one inch stripes (25.4 mm) and laminated onto white painted adhesive coated steel substrates (approx. 30 mm×100 mm) which were supplied by TOTAL (France). These substrates are used by TOTAL for the construction of gasoline and diesel fuel pumps. The samples were allowed to condition for 24 h at room temperature before testing was carded out.

Dripping Test

The pump panel samples were subjected to dripping gasoline and diesel fuel, respectively, with the sample edge being adjusted at an angel of approximately 45° with respect to the dripping direction. The dripping rate was set at 100 $cm^3$ falling within 10 minutes. The incident fuel drips made contact at the film edge, ran irregularly over the pump panel sample and were collected in a recepticle.

Up to 2 liters of fuel were allowed to drip in increments of 100 cm³. The pump panel sample was visually inspected after each 100 cm³ increment with respect to damages to its leading edge before dripping was continued.

The following two types of petroleum fuel were employed for the dripping tests:

unleaded petrol from ESSO (Superbleifrei DIN 95)

diesel fuel from ESSO.

The performance of the pump panel samples was assessed according to a relative scale from 1 to 10 based on personal observation, whereby 1 represents total failure and 10 indicates a very good performance. The ranking is achieved by comparison to non-exposed film material.

| Scale | Observed Performance |
|---|---|
| 1 | 100% film lifting from substrate; film delamination from adhesive layer; film badly swelling; loss of adhesive; heavy staining; matt effects to film |
| 3 | staining; matt effects; extensive adhesive oozing; film swelling, film starting to lift; edge puckering/curl/wrinkling |
| 5 | slight staining, slight film lifting possible; clearly visible adhesive oozing; film wrinkling possible |
| 7 | slight adhesive ooze visible with magnifying glass; film edge swelled, but recovers after swelling lays flat again |
| 9 | no adhesive ooze; no film swelling; slight matt effect possible |
| 10 | no failure |

The rankings 2, 4, 6 and 8 for which no description of performance is explicitly given, are used to indicate intermediate behavior.

EXAMPLE 1

A flexible cast polyvinylchloride backing (thickness 50 µm) while supported by a paper carrier web, was coated with a 40% solids aqueous emulsion of a blend of 65 parts of an acrylic emulsion copolymer of 80 parts ethyl acrylate, 16 parts n-butyl acrylate, and 4 parts acrylic add, and 35 parts of the heat-activatable polyester polyurethane latex BayHydro 140 AQ from Mobay. The coating was dried 10 minutes at 66° C. to give an adhesive layer with a thickness of 30 µm. The adhesive side was then laminated onto a white painted steel substrate provided by TOTAL which was described above. The paper carrier web was discarded and the laminate comprising the painted steel substrate and the two adhesive layer film composite, was subjected to the dripping test after a dwell time of 3 days.

After having dripped 300 cm³ of unleaded petrol fuel from ESSO, a small amount of edge staining to a light brown/pink color was observed. No further changes were noticed when continuing dripping up to 2,000 cm³. The overall ranking of this film when being subjected to unleaded petrol, was 9.

A similar behavior was observed when dripping diesel fuel from ESSO. A slight staining was observed after dripping of 400 cm³ of the diesel fuel, but no further changes were found when continuing dripping up to 2,000 cm³. The overall ranking of this film when being subjected to diesel fuel, was 9.

EXAMPLE 2

A two adhesive layer film composite was prepared by laminating an acrylate pressure-sensitive adhesive layer from a transfer film onto the one adhesive layer film composite prepared in Example 1 comprising a 65/35 acrylic latex/polyurethane latex adhesive layer (layer thickness 30 µm) on a polyvinylchloride backing (thickness 50 µm). The acrylate adhesive transfer film which was prepared according to the method described in . . . . comprised a 90/10 copolymer of 2-methylbutylacrylate and acrylic acid on a siliconized paper (120 g/m²) liner. The thickness of the adhesive layer of the transfer film was 40 µm. The siliconized paper liner was discarded, and the two adhesive layer film composite was laminated onto a white painted steel substrate provided by TOTAL which was described above. The laminate was then subjected to the dripping test after a dwell time of 3 days.

The following table gives the performance of the laminate, after having dripped the respective amount of unleaded petrol from ESSO:

| amount of petrol dripped (cm³) | Observed Performance |
|---|---|
| 100 | slight edge lifting/puckering; adhesive layers remain on substrate, slight delamination of backing from adhesive layers; adhesive layers slightly stained (brownish) |
| 200 | further edge lifting and staining of adhesive layers; film recovers as petrol evaporation occurs |

The overall ranking of this film when being subjected to unleaded petrol, was 6.

With respect to diesel fuel, no changes could be observed in comparison to a non-exposed control film after dripping of 200 cm³ of diesel fuel from ESSO. When continuing dripping up to 2,000 cm³, only very slight changes (small staining) could be observed. The overall ranking of this film when being subjected to diesel fuel, was 9.

EXAMPLE 3

Example 2 was repeated except that the acrylic/urethane ratio of the first layer was 80/20.

The following table gives the performance of the after having dripped the respective amount of unleaded petrol from ESSO:

| amount of petrol dripped (cm³) | Observed performance |
|---|---|
| 100 | slight edge lifting and film wrinkling; slight abrasive ooze; adhesive layers slightly stained (brownish) |
| 200 | further edge lifting/puckering and staining of adhesive layers; staining of adhesive layers; film swelling |

The overall ranking of this film when being subjected to unleaded petrol, was 5.

With respect to diesel fuel, no changes could be observed in comparison to a non-exposed control film after dripping of 200 cm³ of diesel fuel from ESSO. When continuing dripping up to 2,000 cm³, only very slight changes (small staining) could be observed. The overall ranking of this film when being subjected to diesel fuel, was 9.

COMPARATIVE EXAMPLE 1

Example 2 was repeated except that the acrylic/urethane ratio of the first layer was 100/0.

The following table gives the performance of the laminate after having dripped the respective amount of unleaded petrol from ESSO:

| amount of petrol dripped (cm³) | performance |
|---|---|
| 150 | very slight yellowing staining; edge swelling and lifting of film edge |
| 250 | edge swelling and lifting; staining; wrinkling of film commenced, adhesive ooze |

The overall ranking of this film when being subjected to unleaded petrol, was 4.

With respect to diesel fuel, no changes could be observed in comparison to a non-exposed control film after dripping of 200 cm³ of diesel fuel from ESSO. When continuing dripping up to 2,000 cm³, only very slight changes (small staining) could be observed. The overall ranking of this film when being subjected to diesel fuel, was 9.

COMPARATIVE EXAMPLE 2

A one adhesive layer film was prepared by laminating an acrylic adhesive transfer film (described in example 2) onto a polyvinyl backing (described in example 1). This one adhesive layer film composite which is commercially available from 3M, St. Paul, U.S.A. under the tradename Scotchcal™ 3650 film, was laminated onto a while painted steel substrate provided by TOTAL which was described above. The laminate was then subjected to the dripping test after a dwell time of 3 days.

The following table gives the performance of the laminate after having dripped the respective amount of unleaded petrol from ESSO:

| amount of petrol dripped (cm³) | Observed performance |
|---|---|
| 100 | pronounced edge puckering and film lifting (no adhesive remains on the substrate) |
| 200 | wrinkling throughout, further film lifting (no adhesive remains on the substrate); film recovers to a degree of 80% as petrol evaporation occurs |

The overall ranking of this film when being subjected to unleaded petrol, was 4.

With respect to diesel fuel, no changes could be observed in comparison to a non-exposed control film after dripping of 200 cm³ of diesel fuel from ESSO. When continuing dripping up to 2,000 cm³, only very slight changes (small staining) could be observed. The overall ranking of this film when being subjected to diesel fuel, was 9.

The performance of the films tested in examples 1-3 and comparative examples 1 and 2 is summarized in table 1.

TABLE 1

Ranking summary of film performance

| Ex | number of adhesive layers | adhesive layers on polyvinyl backing | petrol fuel | diesel fuel |
|---|---|---|---|---|
| 1 | 1 | 65:35 acrylic dispersion/urethane dispersion | 9 | 9 |
| 2 | 2 | (1) 65:35 acrylic dispersion/urethane dispersion (2) 90:10 copolymer of MBA/AA | 6 | 9 |
| 3 | 2 | (1) 80:20 acrylic dispersion/urethane dispersion (2) 90:10 copolymer of MBA/AA | 5 | 9 |
| Comparative 1 | 2 | (1) 100:0 acrylic dispersion/urethane dispersion (2) 90:10 copolymer of MBA/AA | 4 | 9 |
| Comparative 2 | 1 | 90:10 copolymer of MBA/AA | 4 | 9 |

MBA = 2-methylbutyl acrylate
AA = acrylic acid

What is claimed is:

1. A thin flexible composite comprising a thin flexible polymeric backing bearing a first adhesive layer comprising a blend of from 10–99 wt. % of an acrylic latex and from 1 to 90 wt. % of heat-activatable urethane latex adhesive, and a second adhesive layer applied on top of said first adhesive layer comprising a pressure-sensitive adhesive which exhibits an initial adhesion as to allow reliable positioning and initial removability of the film composite and adhesion build-up to permanently bond the film composite to the substrate after a prolonged dwell time, wherein the first adhesive layer is a pressure-sensitive adhesive at room temperature against the polymeric backing.

2. A film composite according to claim 1 wherein the backing is printable.

3. A film composite according to claim 2 wherein the backing is a polyvinylchloride film.

4. A film composite according to claim 1 wherein the urethane latex adhesive when forming a film exhibits an elongation of at least 100%.

5. A film composite according to claim 1 wherein the acrylic latex comprises at least 75 wt. % of an alkyl acrylate component with respect to the mass of the monomer component of the precursor of the acrylic latex whereby the alkyl acrylate component comprises one or more alkyl acrylates the acrylic groups of which have an average from 5 to 12 C atoms.

6. A film composite according to claim 1 wherein the second adhesive layer exhibits an average thickness between 10–200 μm.

7. A film composite according to claim 1 wherein the pressure sensitive adhesive material of the second adhesive layer is derived from a material selected from the group consisting of polyacrylates, vinyl ether polymers, silicone pressure sensitive adhesives, natural rubbers, styrene-butadiene-styrene block copolymers, elastomeric rubbers, and blends of these materials.

8. A film composite according to claim 7 wherein said pressure sensitive adhesive material of the second adhesive layer comprises a copolymer which is the reaction product of a functional monomer component copolymerizable with an alkyl acrylate monomer component.

9. A method of using a film composite comprising the step of applying the film composite to a substrate exposed to organic solvents, wherein the film composite comprises a thin flexible backing bearing a first adhesive layer comprising a blend of from 10–99 wt. % of an acrylic latex and from 1 to 90 wt. % of heat-activatable urethane latex adhesive, and optionally bearing a second adhesive layer applied on top of said first adhesive layer comprising a pressure-sensitive adhesive which exhibits an initial adhesion as to allow reliable positioning and initial removability of the film composite and adhesion build-up to permanently bond the film composite to the substrate steer a prolonged dwell time.

10. A thin flexible composite comprising a thin flexible backing bearing a first adhesive layer comprising a blend of from 10–99 wt. % of an acrylic latex and from 1 to 90 wt. % of heat-activatable urethane latex adhesive, and a second adhesive layer applied on top of said first adhesive layer comprising a pressure-sensitive adhesive which exhibits an initial value of 180° peel adhesion on stainless steel of at least one day of between 15–25 N/2.54 cm to allow reliable positioning and initial removability on a substrate and a value of 180° peel adhesion on stainless steel of at least about 3 days of at least 20 N/2.54 cm to ensure permanent bonding of the film composite to the substrate.

11. The film composite according to claim 10, wherein the backing is printable.

12. The film composite according to claim 11, wherein the backing is a polyvinylchloride film.

13. The film composite according to claim 10, wherein the urethane latex adhesive when forming a film exhibits an elongation of at least 100%.

14. The film composite according to claim 10, wherein the acrylic latex comprises at least 75 wt. % of an alkyl acrylate component with respect to the mass of the monomer component of the precursor of the acrylic latex whereby the alkyl acrylate component comprises one or more alkyl acrylates, the acrylic groups of which have an average from 5 to 12 C atoms.

15. The film composite according to claim 10, wherein the second adhesive layer exhibits an average thickness between 10–200 μm.

16. The film composite according to claim 10, wherein the pressure sensitive adhesive material of the second adhesive layer is derived from a material selected from the group consisting of polyacrylates, vinyl ether polymers, silicone pressure sensitive adhesives, natural rubbers, styrene-butadiene-styrene block copolymers, elastomeric rubbers, and blends of these materials.

17. The film composite according to claim 16, wherein said pressure sensitive adhesive material of the second adhesive layer comprises a copolymer which is the reaction product of a functional monomer component copolymerizable with an alkyl acrylate monomer component.

* * * * *